United States Patent
Li et al.

(10) Patent No.: US 11,673,562 B1
(45) Date of Patent: Jun. 13, 2023

(54) METHOD, APPARATUS, COMPUTER STORAGE MEDIUM AND TERMINAL FOR IMPLEMENTING AUTONOMOUS DRIVING DECISION-MAKING

(71) Applicant: Tsinghua University, Beijing (CN)

(72) Inventors: Jun Li, Beijing (CN); Hong Wang, Beijing (CN); Liang Peng, Beijing (CN); Wenhao Yu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/864,415

(22) Filed: Jul. 14, 2022

(30) Foreign Application Priority Data

Jan. 11, 2022 (CN) .......................... 202210024357.8

(51) Int. Cl.
*B60W 50/00* (2006.01)
*B60W 60/00* (2020.01)

(52) U.S. Cl.
CPC .......... *B60W 50/00* (2013.01); *B60W 60/001* (2020.02); *B60W 2050/0012* (2013.01); *B60W 2050/0022* (2013.01); *B60W 2420/42* (2013.01)

(58) Field of Classification Search
CPC ....... B60W 60/00272; B60W 2556/10; B60W 2540/21; B60W 2556/45; B60W 50/08;
(Continued)

(56) References Cited

U.S. PATENT DOCUMENTS

2014/0037138 A1* 2/2014 Sato ........................ G06V 20/58
382/103
2017/0154241 A1* 6/2017 Shambik .............. G06V 40/103
(Continued)

FOREIGN PATENT DOCUMENTS

| CN | 111046980 A | 4/2020 |
|---|---|---|
| CN | 113268870 A | 8/2021 |
| WO | WO2021226921 A1 | 11/2021 |

OTHER PUBLICATIONS

The First Office Action dated Feb. 18, 2022 for Chinese Patent Application No. 202210024357.8 and English Translation.
(Continued)

*Primary Examiner* — Babar Sarwar
(74) *Attorney, Agent, or Firm* — Ling Wu; Stephen Yang; Ling and Yang Intellectual Property

(57) ABSTRACT

A method, an apparatus, a computer storage medium and a terminal for implementing autonomous driving decision-making are disclosed. Image information is processed by the probabilistic object detection to obtain a probabilistic object detection result set containing multiple probabilistic object detection result. An uncertainty in the object detection process is estimated by the probabilistic object detection results contained in the set of the probabilistic object detection result. An environmental state information set is generated from the probabilistic object detection results in the probabilistic object detection result set and the perceptual information, then an optional action set considering the uncertainty is generated using a preset decision-making method, and an action for vehicle driving control is determined according to the optional action set and the environmental state information set.

10 Claims, 2 Drawing Sheets

---

401 — Probabilistic object detection module receives image information, and obtains a set probabilistic object detection results by probabilistic object detection 402 — State construction module generates an environmental state information set according to the set of the probabilistic object detection results and perceptual information 403 — Action generation module generates an optional action set based on the generated environmental state information set 404 — Action selection module selects an action for vehicle control according to the generated optional action set and environmental state information set

(58) Field of Classification Search
CPC .......... B60W 60/0015; G06K 9/00791; G08G 1/165; G08G 1/166; G06V 20/56
See application file for complete search history.

(56) References Cited

U.S. PATENT DOCUMENTS

| | | | |
|---|---|---|---|
| 2018/0075747 A1* | 3/2018 | Pahwa | B60W 40/10 |
| 2020/0189574 A1* | 6/2020 | Vignard | G08G 1/166 |
| 2020/0283030 A1* | 9/2020 | Raichelgauz | G08G 1/166 |
| 2021/0165409 A1* | 6/2021 | Berntorp | G05D 1/0214 |

OTHER PUBLICATIONS

The Second Office Action dated Mar. 16, 2022 for Chinese Patent Application No. 202210024357.8 and English Translation.

* cited by examiner

METHOD, APPARATUS, COMPUTER STORAGE MEDIUM AND TERMINAL FOR IMPLEMENTING AUTONOMOUS DRIVING DECISION-MAKING

CROSS-REFERENCE TO RELATED APPLICATION

The present application claims priority of Chinese Patent Application No. 202210024357.8, filed to the CNIPA on Jan. 11, 2022 and entitled "Method, Apparatus, Computer Storage Medium and Terminal for Implementing Autonomous Driving Decision-making", the contents disclosed in the above-mentioned application are hereby incorporated as a part of this application.

TECHNICAL FIELD

The present application relates, but is not limited to, unmanned driving technologies, in particular to a method, an apparatus, a computer storage medium and a terminal for implementing autonomous driving decision-making.

BACKGROUND

Unmanned driving technologies can improve traffic efficiency, reduce commuting costs and improve traffic safety. Unmanned driving is generally divided into a perception layer, a decision layer and a control layer. The perception layer acquires environmental state information, the decision layer makes a motion decision based on the environmental state information, and the control layer implements tracking of a motion trajectory based on the motion decision. In this process, the decision layer makes motion decisions completely according to the environmental state information given by the perception layer.

Object detection technology is one of the important technologies for the perception layer of an unmanned vehicle. Based on probabilistic object detection by an object detection algorithm, the perception layer acquires an object detection result including semantic information of objects around the autonomous vehicle (category information of objects). After the perception module acquires the perceptual information, the environmental state information is generated according to the object detection result and the perceptual information. After the generated environmental state information is input to the decision layer, the decision layer makes motion decisions.

At present, object detection algorithms are mostly based on deep neural networks. However, due to complex and variable actual environments, large losses and noises of sensors during information collection, defects of cognitive algorithms and a limited training set of networks, an object detection algorithm cannot ensure that an absolutely accurate result can be obtained in any scene, results of probabilistic object detection may be inaccurate or incorrect, thus motion decisions based on such results may be invalid or have safety problems. A problem to be solved in unmanned driving applications is how to improve the safety of motion decision-making.

SUMMARY

The following is a summary of the subject matters described herein in detail. The summary is not intended to limit the scope of protection of claims.

Embodiments of the present application provide a method, an apparatus, a computer storage medium and a terminal for implementing autonomous driving decision-making, which can ensure the safety of autonomous driving.

An embodiment of the present application provides a method for implementing autonomous driving decision-making, which includes the following steps: performing probabilistic object detection on image information collected by an unmanned vehicle to obtain a set of probabilistic object detection results; generating a piece of environmental state information according to perceptual information and each probabilistic object detection result in the obtained set of the probabilistic object detection results respectively, and grouping the generated pieces of environmental state information into an environmental state information set; generating an optional action set of optional actions used for vehicle control according to the generated environmental state information set; and determining an action used for vehicle control according to the generated optional action set and the environmental state information set; wherein the perceptual information and the image information are collected at a same time moment.

In another aspect, an embodiment of the present application further provides a computer storage medium storing a computer program, wherein when the computer program is executed by a processor, the above method for implementing autonomous driving decision-making is implemented.

In another aspect, an embodiment of the present application further provides a terminal, which includes a memory and a processor, wherein a computer program is stored in the memory; the processor is configured to execute the computer program in the memory; wherein when the computer program is executed by a processor, the above method for implementing autonomous driving decision-making is implemented.

In another aspect, an embodiment of the present application further provides an apparatus for implementing autonomous driving decision-making, which includes a probabilistic object detection module, a state construction module, a generation action module and a selection action module; wherein the probabilistic detection module is configured to perform probabilistic object detection on image information collected by an unmanned vehicle to obtain a set of probabilistic object detection results; the state construction module is configured to generate a piece of environmental state information according to perceptual information and each probabilistic object detection result in the obtained set of probabilistic object detection results respectively, and group the generated pieces of environmental state information into an environmental state information set; the generation action module is configured to generate an optional action set of optional actions used for vehicle control according to the generated environmental state information set; and the selection action module is configured to determine an action used for vehicle control according to the generated optional action set and environmental state information set; wherein the perceptual information and the image information are collected at the same time moment.

The technical solution of the present application includes the following steps: performing probabilistic object detection on image information collected by an unmanned vehicle to obtain a set of probabilistic object detection results; generating a piece of environmental state information according to perceptual information and each probabilistic object detection result in the obtained set of the probabilistic object detection results respectively, and grouping the generated pieces of environmental state information into an environmental state information set; generating an optional action set of optional actions used for vehicle control according to the generated environmental state information set; and determining an action used for vehicle control according to the generated optional action set and the environmental state information set, wherein the perceptual information and the image information are collected at a same time moment. In the embodiment of the present application, the image information is processed by the probabilistic object detection to obtain the set of the probabilistic object detection results containing multiple probabilistic object detection results. An uncertainty in an object detection process is estimated by the probabilistic object detection results contained in the set of the probabilistic object detection results. One piece of the environmental state information is generated by each probabilistic object detection result and the perceptual information. The environmental state information set is generated from the probabilistic object detection results in the set of the probabilistic object detection results and the perceptual information, then an optional action set considering uncertainty is generated based on the environmental state information set, and an action used for vehicle driving control is determined according to the optional action set and the environmental state information set, which improves the safety of autonomous driving when perception results cannot be ensured to be absolutely accurate.

Other features and advantages of the present application will be illustrated in subsequent specification, and in addition, partially become apparent from the specification, or be understood by practice of the present application. Objects and other advantages of the present application may be implemented and obtained by structures specifically pointed out in the specification, claims and drawings.

BRIEF DESCRIPTION OF DRAWINGS

Accompanying drawings are used to provide a further understanding of technical solutions of the present application and form a part of the specification, and are used to explain the technical solutions of the present application together with embodiments of the present application and do not constitute a limitation on the technical solutions of the present application.

DETAILED DESCRIPTION

To make the objects, technical solutions and advantages of the present application clearer, embodiments of the present application will be described in detail below with reference to the accompanying drawings. It should be noted that the embodiments in the present application and the features in the embodiments can be combined with each other randomly if there is no conflict.

Steps shown in flowcharts of the drawings may be performed in a computer system such as a set of computer executable instructions. Moreover, although a logical order is shown in the flowchart, in some cases, the steps shown or described may be performed in an order different from that described herein.

Figure 1:
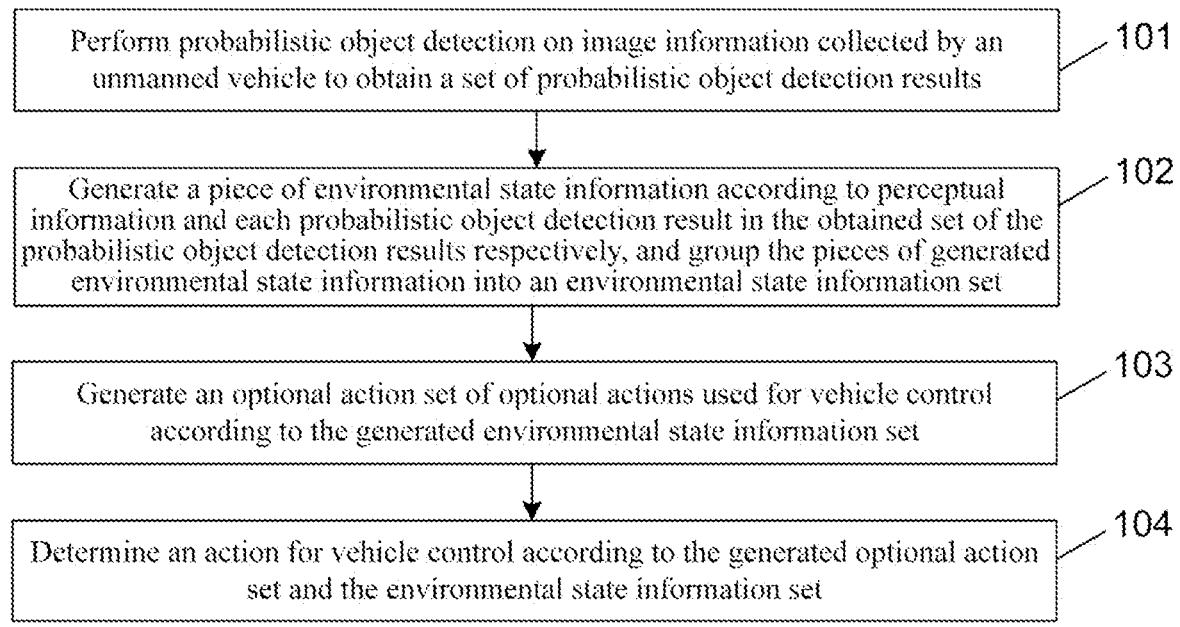
FIG. 1 is a flowchart of a method for implementing autonomous driving decision-making according to an embodiment of the present application.

FIG. 1 is a flowchart of a method for implementing autonomous driving decision-making according to an embodiment of the present application. As shown in FIG. 1, the method includes steps 101-104.

In step 101, probabilistic object detection is performed on image information collected by an unmanned vehicle to obtain a set of probabilistic object detection results.

It should be noted that the Probabilistic Object Detection (POD) in the embodiment of the present application is a kind of method for estimating uncertainty in an object detection process based on the Monte Carlo sampling principle in related technologies. Specific implementations thereof include existing algorithms such as an object detection method based on Monte Carlo dropout. The number of the probabilistic object detection results contained in the set of the probabilistic object detection results may be determined according to a number of feedforward in the probabilistic object detection algorithm, wherein the number of feedforwards may be set empirically by a person skilled in the art.

In step 102, a piece of environmental state information is generated according to perceptual information and each probabilistic object detection result in the obtained set of the probabilistic object detection results respectively, and the generated pieces of environmental state information are grouped into an environmental state information set wherein the perceptual information and the image information are collected at the same time moment.

In an exemplary example, the perceptual information of the embodiment of the present application includes one or any combination of the following: position information of an object around an autonomous vehicle, driving state information of the autonomous vehicle, map information, and the like. The perceptual information can be acquired by a radar, a global positioning system (GPS) module and a high-precision map module, etc.

A method for generating the environmental state information from the probabilistic object detection results and the perceptual information in the embodiment of the present application is the same as the method for generating environmental state information according to the object detection results and perceptual information in the related technologies, except for replacing the object detection results in the related technologies with the probabilistic object detection results.

In step 103, an optional action set of optional actions used for vehicle control is generated according to the generated environmental state information set.

In an exemplary example, generating the optional action set of the optional actions used for vehicle control according to the generated environmental state information set in the embodiment of the present application includes: processing the environmental state information set by a preset first decision-making method to generate a first action; processing each piece of environmental state information in the environmental state information set by a preset second decision-making method to generate a second action corresponding to the environmental state information respectively; and determining a set composed of the first action and the second action as the optional action set; wherein the first decision-making method includes a decision-making method without considering object semantic information, and the second decision-making method includes a decision-making method considering object semantic information.

In an embodiment of the present application, based on a mixed decision-making framework of the first decision-making method and the second decision-making method, an optional action set containing an optional action considering the object semantic information and an optional action without considering the object semantic information is generated.

The first decision-making method in the embodiment of the present application includes a decision-making method based on a rule model in related technologies, which implements autonomous driving under strict constraints and can determine the safety of an autonomous driving system. In an exemplary example, the first decision-making method of the embodiment of the present application includes an A* local path planning algorithm and an artificial potential field method that does not contain categories, and the like.

The second decision-making method of the embodiment of the present application includes a decision-making method based on deep reinforcement learning in related technologies, which can improve the efficiency of an autonomous driving system by estimating a state transition probability to solve an optimization problem. Furthermore, the second decision-making method generally has a strong generalization ability, which improves the system's ability to cope with unfamiliar scenes. In an exemplary example, the second decision-making method of the embodiment of the present application includes a decision-making method based on reinforcement learning, a Minimizing Overall Braking Induced by Lane change (MOBIL) and the like.

In step 104, an action used for vehicle control is determined according to the generated optional action set and the environmental state information set.

In an exemplary example, determining the action used for the vehicle driving control in step 104 according to the embodiment of the present application includes: for each action used for vehicle control in the optional action set, calculating an action value under each piece of environmental state information in the environmental state information set respectively, and grouping the action values under all the environmental state information into a set of action values for the action; according to the set of the calculated action values for each action, determining the action value considering an uncertainty based on a lower bound of a confidence interval according to a preset strategy; and determining an action with a largest action value with uncertainty as the action used for vehicle control.

In an embodiment of the present application, according to a distribution of the perceived environmental state information set, values of all optional actions under the uncertainty are estimated, and then the action with the largest action value under the uncertainty is selected, which is used for vehicle control and improves the safety of autonomous vehicle's driving.

In an exemplary example, determining the action value considering the uncertainty based on the lower bound of the confidence interval according to the preset strategy according to the embodiment of the present application includes: calculating an expectation value and a standard deviation of an action value with a certainty; and according to the calculated expectation value and the standard deviation, determining an action value with an uncertainty.

In an exemplary example, the action value with the uncertainty of the embodiment of the present application is calculated by the following formula:

$$Q(a) = \hat{\mathbb{E}}(a) - k\hat{\sigma}(a);$$

wherein $$\hat{\mathbb{E}}(a) = \frac{1}{T}\sum_{i=1}^{T} \mathbb{Q}(s_i, a),$$

denotes an expectation value of an action value of action a; $\mathbb{Q}(s_i, a)$ denotes the action value with the certainty of environmental state information; an environmental state information set is $$\{s_1, s_2, \ldots, s_i, \ldots, s_T\}; \hat{\sigma}(a) = \sqrt{\frac{1}{T}\sum_{i=1}^{T}(\mathbb{Q}(s_i, a) - \hat{\mathbb{E}}(a))^2}$$

denotes the standard deviation of the action value with the certainty; k is a preset parameter reflecting a weight of uncertainty; T is a number of feedforward of the probabilistic object detection.

In the embodiment of the present application, the image information is processed by the probabilistic object detection to obtain the set of the probabilistic object detection results containing multiple probabilistic object detection results. The uncertainty in the object detection process is estimated by the probabilistic object detection results contained in the set of the probabilistic object detection results. One piece of the environmental state information is generated by each probabilistic object detection result and perceptual information. The environmental state information set is generated from the probabilistic object detection results in the set of the probabilistic object detection results and the perceptual information, then an optional action set considering the uncertainty is generated based on the environmental state information set, and an action for vehicle driving control is determined according to the optional action set and the environmental state information set, which improves the safety of autonomous driving when perception results cannot be ensured to be absolutely accurate.

In an embodiment of the present application, a computer storage medium is further provided, and a computer program is stored in the computer storage medium, wherein when the computer program is executed by a processor, the above method for implementing autonomous driving decision-making is implemented.

In an embodiment of the present application, a terminal is further provided, which includes a memory and a processor, wherein a computer program is stored in the memory; the processor is configured to execute the computer program in the memory; and when the computer program is executed by the processor, the method for implementing autonomous driving decision-making as described above is implemented.

Figure 2:
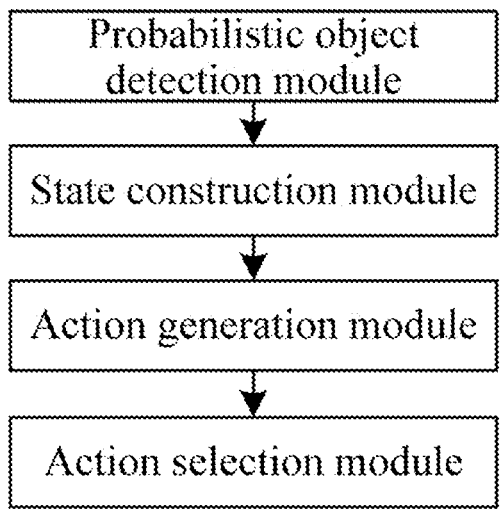
FIG. 2 is a structural block diagram of an apparatus for implementing autonomous driving decision-making according to an embodiment of the present application.

FIG. 2 is a structural block diagram of an apparatus for implementing autonomous driving decision-making according to an embodiment of the present application. As shown in FIG. 2, the apparatus includes a probabilistic object detection module, a state construction module, a generation action module and a selection action module.

The probabilistic object detection module is configured to perform probabilistic object detection on image information collected by an unmanned vehicle to obtain a set of probabilistic object detection results.

The state construction module is configured to generate, respectively, pieces of environmental state information according to perceptual information and each probabilistic object detection result in the obtained set of the probabilistic object detection results, and group the generated pieces of environmental state information into an environmental state information set.

The generation action module is configured to generate an optional action set of optional actions used for vehicle control according to the generated environmental state information set.

The selection action module is configured to determine an action used for vehicle control according to the generated optional action set and the environmental state information set.

Herein, the perceptual information and the image information are collected at a same time moment.

In an embodiment of the present application, the image information is processed by the probabilistic object detection to obtain the set of the probabilistic object detection results containing multiple probabilistic object detection results. An uncertainty in the object detection process is estimated by the probabilistic object detection results contained in the set of the probabilistic object detection results. One piece of environmental state information is generated by each probabilistic object detection result and perceptual information. The environmental state information set is generated from the probabilistic object detection results in the set of the probabilistic object detection results and the perceptual information, then an optional action set considering the uncertainty is generated based on the environmental state information set, and an action used for vehicle driving control is determined according to the optional action set and the environmental state information set, which improves the safety of autonomous driving when perception results cannot be ensured to be absolutely accurate.

In an exemplary example, the generation action module of the embodiment of the present application is configured to: process the environmental state information set by a preset first decision-making method to generate a first action; process each piece of environmental state information in the environmental state information set by a preset second decision-making method to generate a second action corresponding to the environmental state information respectively; and determine a set composed of the first action and the second action as the optional action set; wherein the first decision-making method includes a decision-making method without considering object semantic information, and the second decision-making method includes a decision-making method considering the object semantic information.

In an exemplary example, the selection action module of the embodiment of the present application is configured to: for each action used for vehicle control in the optional action set, calculate an action value with certainty of each corresponding piece of environmental state information; according to the calculated action value of the certainty for each action, determine an action value considering an uncertainty based on a lower bound of a confidence interval according to a preset strategy; and determine an action with the largest action value with uncertainty as the action used for vehicle control.

In an exemplary example, the selection action module of the embodiment of the present application being configured to determine the action value considering the uncertainty based on the lower bound of the confidence interval according to the preset strategy includes: calculating an expectation value and a standard deviation of an action value with a certainty; and according to the calculated expectation value and the standard deviation, determining an action value with an uncertainty.

In an exemplary example, the selection action module of the embodiment of the present application calculates the action value with the uncertainty by the following formula:

$$Q(a) = \hat{\mathbb{E}}(a) - k\hat{\sigma}(a);$$

wherein $$\hat{\mathbb{E}}(a) = \frac{1}{T}\sum_{i=1}^{T}\mathbb{Q}(s_i, a)$$

denotes an expectation value of an action value of action a; $\mathbb{Q}(s_i, a)$ denotes the action value with the certainty of environmental state information; the environmental state information set is $\{s_1, s_2, \ldots, s_i, s_T\}$;

$$\hat{\sigma}(a) = \sqrt{\frac{1}{T}\sum_{i=1}^{T}(\mathbb{Q}(s_i, a) - \hat{\mathbb{E}}(a))^2}$$

denotes the standard deviation of the action value with the certainty; k is a preset parameter reflecting a weight of uncertainty; and T is a number of feedforward of the probabilistic object detection.

Embodiments of the present application are briefly described below by application examples which are only used to state the embodiments of the present application and are not used to limit the scope of protection of the present application.

Application Example

Figure 3:
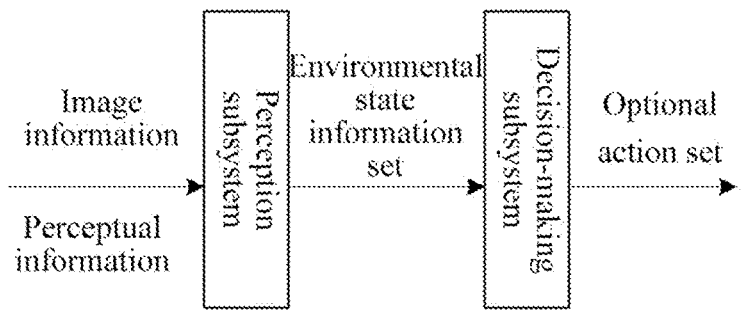
FIG. 3 is a schematic diagram of composition of a system for implementing autonomous driving decision-making according to an application example of the present application.

The application example of the present application is based on a division of a perception layer and a decision layer, and implements a method for implementing autonomous driving decision-making based on a system composed of a perception subsystem and a decision-making subsystem. FIG. 3 is a schematic diagram of a composition of a system for implementing autonomous driving decision-making according to an application example of the present application, as shown in FIG. 3, the system includes a perception subsystem and a decision-making subsystem.

The sensing subsystem collects image information of a road when an autonomous vehicle is running and perceptual information including driving information of the autonomous vehicle, processes the image information by using probabilistic object detection, estimates an uncertainty in an object detection process, constructs an environmental state information set, and outputs it to the decision-making subsystem.

According to the environmental state information set given by the perception subsystem, the decision-making subsystem generates an optional action set based on a hybrid decision-making framework. Then, according to distribution of the environmental state information set given by perception subsystem, action values of all optional actions under the uncertainty are estimated, and then an action used for vehicle control is selected.

Figure 4:
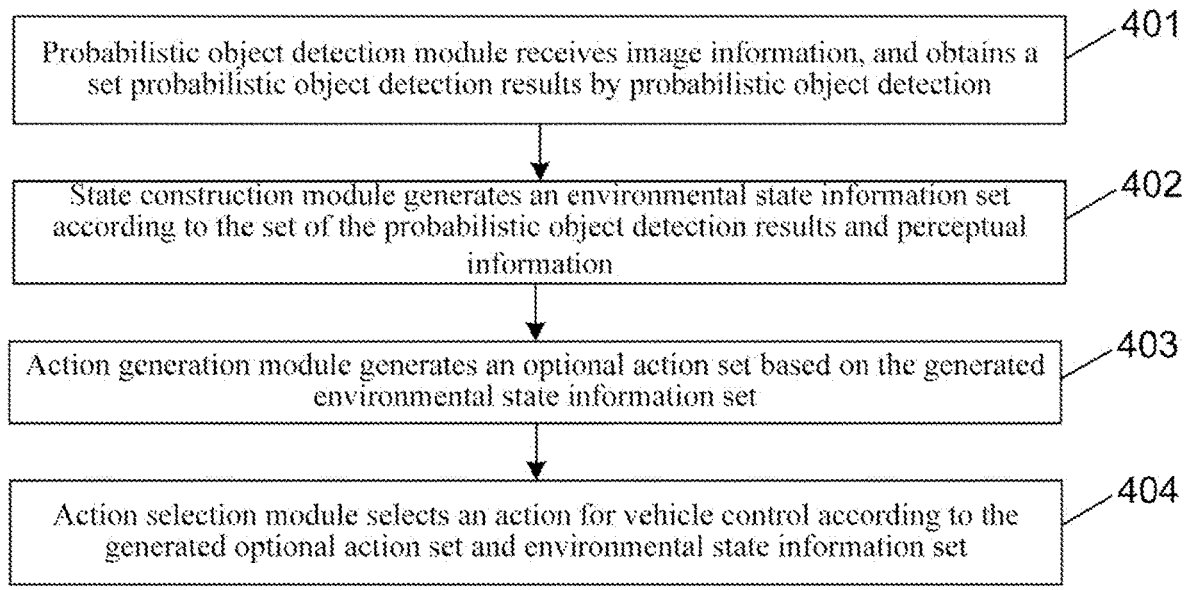
FIG. 4 is a schematic flowchart diagram of an application example of the present application.

FIG. 4 is a schematic flowchart of an application example of the present application. As shown in FIG. 4, based on the composition of the apparatus shown in FIG. 2, processing performed in the application example of the present application include steps 401 to 404.

In step 401, a probabilistic object detection module receives image information I, and obtains a set of probabilistic object detection results $\{\mathcal{O}_1, \mathcal{O}_2, \ldots, \mathcal{O}_i, \ldots, \mathcal{O}_T\}$ by the probabilistic object detection; wherein $\mathcal{O}_i$ represents the i-th probabilistic object detection result, and T is a number of feedforward of the probabilistic object detection.

In the application example of the present application, obtaining the set of the probabilistic object detection results by the probabilistic object detection includes:

randomly sampling a network weight of the probabilistic object detection from a weight distribution of network pre-training, and performing the probabilistic object detection on the number of feedforward based on the randomly sampled network weight to obtain a set of the probabilistic object detection results $\{\mathcal{O}_1, \mathcal{O}_2, \ldots, \mathcal{O}_i, \ldots, \mathcal{O}_T\}$, which contains T probabilistic object detection results.

In step 402, according to the set of the probabilistic object detection results $\{\mathcal{O}_1, \mathcal{O}_2, \ldots, \mathcal{O}_T\}$, and perceptual information e, a state construction module generates an environmental state information set $\{s_1, s_2, s_i, \ldots, s_T\}$; wherein $s_i$ represents environmental state information generated according to the probabilistic object detection results $\mathcal{O}_i$ and the perceptual information.

The environmental state information of the application example of the present application may be obtained by referring to a method of generating environmental state information according to object detection results and perceptual information in the related technologies, wherein the object detection results are replaced by the probabilistic object detection results of the embodiment of the present application in the processing process. For example, environmental state information is generated by $s_i=f(\mathcal{O}_i, e)$, wherein f is a type of methods of generating environmental state information based on object detection results and perceptual information in the related technologies. It should be noted that the environmental state generated according to the application example of the present application contains semantic information carried in the probabilistic object detection results (including category information of the object).

In step 403, the generation action module generates an optional action set $\mathcal{A}$ based on the generated environmental state information set $\{s_1, s_2, \ldots, s_i, \ldots, s_T\}$.

In the application example of the present application, generating the optional action set A based on the generated environmental state information set $\{s_1, s_2, \ldots, s_i, \ldots, s_T\}$ includes:

The environmental state information set is processed by a preset first decision-making method to generate a first action $a_c=\pi_c(s_1)$. Herein, $\pi_c$ represents a first decision-making method that does not consider the object semantic information. Because the semantic information is not considered, environmental state information in the environmental state information set $\{s_1, s_2, \ldots, s_i, \ldots, s_T\}$ is taken as an input, and actions generated by the first decision-making method are identical.

For each piece of environmental state information in the environmental state information set, a corresponding second action $a_{oi}=\pi_o(s_i)$ is generated by using a preset second decision-making method respectively, and a set $\mathcal{A}_o=\{a_{o1}, a_{o2}, \ldots, a_{oi}, \ldots, a_{oT}\}$ is obtained, wherein $\pi_o$ represents a second decision-making method considering the object semantic information.

The actions generated by the first decision-making method and the actions generated by the second decision-making method are grouped into the optional action set $\mathcal{A}$; $\mathcal{A} = \mathcal{A}_o \cup \{a_c\} = \{a_c, a_{o1}, a_{o2}, \ldots, a_{oi}, \ldots, a_{oT}\}$.

In step 404, the selection action module selects an action used for vehicle control according to the generated optional action set and environmental state information set.

In the application example of the present application, selecting the action used for vehicle control includes: calculating an action value Q(a) with uncertainty for each action in the optional action set $\mathcal{A}$; taking an action with a largest action value Q(a) with uncertainty, as the action used for vehicle control. The action used for vehicle control is $a^* = \arg\max_a Q(a)$.

In the application example of the present application, calculating the action value Q(a) with uncertainty for each action in the optional action set $\mathcal{A}$ includes: for each piece of environmental state information $s_i$, calculating an action value with certainty of the environmental state information, $\mathbb{Q}(s_i, a)$. $i=1, 2, \ldots, T$, wherein $\mathbb{Q}$ is a kind of methods for calculating an action value of an action a, based on certainty of environmental state in the related technologies; according to the calculated action value $\mathbb{Q}(s_i, a)$ with certainty of the environmental state information, and an expectation value $\hat{\mathbb{E}}(a)$ of the action value, determining the action value Q(a) with uncertainty based on a lower bound of a confidence interval.

In the application example of the present application, determining the action value Q(a) with uncertainty based on the lower bound of the confidence interval includes:

estimating an expectation value $$\hat{\mathbb{E}}(a) = \frac{1}{T}\sum_{i=1}^{T} \mathbb{Q}(s_i, a)$$

of the action value, and calculating a standard deviation of the action value according to the expectation value $\hat{\mathbb{E}}(a)$ of the estimated action value:

$$\hat{\sigma}(a) = \sqrt{\frac{1}{T}\sum_{i=1}^{T}(\mathbb{Q}(s_i, a) - \hat{\mathbb{E}}(a))^2}$$

calculating an action value considering uncertainty $Q(a) = \hat{\mathbb{E}}(a) - k\hat{\sigma}(a)$, wherein k is a preset parameter reflecting a weight of uncertainty, and T is a feedforward number of the probabilistic object detection.

According to the application example of the present application, the uncertainty of the perception process is taken into consideration in decision-making, accurate perception under any conditions is not required. Only by estimating the process of perceived uncertainty, that is, the decision layer can analyze the expectation values of optional the actions based on the perceived uncertainty information, estimate the distribution of action values, and comprehensively select the optimal actions, thus improving the performance of the autonomous vehicle when perception performance is limited. By designing a hybrid decision-making framework and an action value estimation method based on uncertainty, the autonomous vehicle can adaptively adjust their strategic tendencies under different levels of perceived uncertainty. In the hybrid decision-making framework, a conservative strategy (the first decision-making method) does not consider the semantic information with high uncertainty when making decisions, which can ensure the safety of autonomous driving when object detection performance is limited. An optimization strategy (the second decision-making method) can guarantee the efficiency of autonomous driving when the object detection result is correct. By reasonable designing the value estimation method, under high perceived uncertainty, the conservative strategy is chosen, and under low uncertainty, the optimization strategy is chosen. Therefore, on the premise of maintaining the efficiency of autonomous driving, the performance of the autonomous driving system when facing high perceived uncertainty scenes is improved.

It can be understood by those of ordinary skills in the art that all or some steps in the method disclosed above and function modules/units in the system and the apparatus may be implemented as software, firmware, hardware, and proper combinations thereof. In a hardware implementation mode, a division of the function modules/units mentioned in the above description is not always a division corresponding to physical components. For example, a physical component may have multiple functions, or multiple physical components may cooperate to execute a function or step. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile and removable and irremovable media implemented in any method or technology for storing information (for example, a computer-readable instruction, a data structure, a program module, or other data). The computer storage medium includes, but not limited to, a Random Access Memory (RAM), a Read Only Memory (ROM), an Electrically Erasable Programmable Read-Only Memory (EEPROM), a flash memory or other memory technologies, a CD-ROM, a Digital Video Disk (DVD) or other compact discs, a cassette, a magnetic tape, a disk memory or other magnetic storage devices, or any other medium configurable to store expected information and accessible for a computer. In addition, it is known to those of ordinary skills in the art that the communication medium usually includes a computer-readable instruction, a data structure, a program module, or other data in a modulated data signal of, such as, a carrier or another transmission mechanism, and may include any information transmission medium.

The invention claimed is:

1. A method for implementing autonomous driving decision-making, comprising:
    performing probabilistic object detection on image information collected by a camera deployed proximity to an unmanned vehicle to obtain a set of probabilistic object detection results;
    generating a piece of environmental state information according to perceptual information acquired by a radar and each probabilistic object detection result in the obtained set of the probabilistic object detection results respectively, and generated pieces of environmental state information are grouped into an environmental state information set;
    generating an optional action set of optional actions used for vehicle control according to the generated environmental state information set; and
    determining an action used for the vehicle control according to the generated optional action set and the environmental state information set;
    wherein the perceptual information and the image information are collected at a same time moment; wherein generating the optional action set of the optional actions used for vehicle control according to the generated environmental state information set comprises:
    processing the environmental state information set by a preset first decision-making method to generate a first action;
    processing each piece of environmental state information in the environmental state information set respectively by a preset second decision-making method to generate a second action corresponding to the environmental state information; and
    determining a set composed of the first action and the second action as the optional action set;
    wherein the preset first decision-making method comprises a decision-making method without considering object semantic information, and the preset second decision-making method comprises a decision-making method considering the object semantic information.

2. The method according to claim 1, wherein determining the action used for the vehicle control comprises:
    for each action used for vehicle control in the optional action set, calculating an action value with certainty of each piece of corresponding environmental state information;
    according to the calculated action value with the certainty for each action, determining an action value considering an uncertainty based on a lower bound of a confidence interval according to a preset strategy; and
    determining an action with a largest action value with uncertainty as the action used for the vehicle control.

3. The method according to claim 2, wherein determining the action value considering the uncertainty based on the lower bound of the confidence interval according to the preset strategy comprises:
    calculating an expectation value and a standard deviation of the action value with the certainty; and
    determining an action value with uncertainty according to the calculated expectation value and standard deviation.

4. The method according to claim 3, wherein the action value with the uncertainty is calculated by following formula:

$$Q(a) = \hat{\mathbb{E}}(a) - k\hat{\sigma}(a);$$

wherein $$\hat{\mathbb{E}}(a) = \frac{1}{T}\sum_{i=1}^{T} \mathbb{Q}(s_i, a),$$

denotes an expectation value of an action value of action a; $\mathbb{Q}(s_i, a)$ denotes an action value with a certainty of environmental state information; the environmental state information set is $\{s_1, s_2, \ldots, s_i, \ldots, s_T\}$;

$$\hat{\sigma}(a) = \sqrt{\frac{1}{T}\sum_{i=1}^{T} (\mathbb{Q}(s_i, a) - \hat{\mathbb{E}}(a))^2}$$

denotes a standard deviation of the action value with the certainty; k is a preset parameter reflecting a weight of uncertainty; and T is a number of feedforward of the probabilistic object detection.

5. A non-transitory computer storage medium storing a computer program, wherein when the computer program is executed by a processor, the method for implementing autonomous driving decision-making according to claim 1 is implemented.

6. A terminal, comprising a memory and a processor, wherein a computer program is stored in the memory;
  wherein the processor is configured to execute the computer program in the memory;
  when the computer program is executed by the processor, the method for implementing autonomous driving decision-making according to claim 1 is implemented.

7. The method according to claim 1, wherein determining the action used for the vehicle control comprises:
  for each action used for the vehicle control in the optional action set, calculating an action value with certainty of each piece of corresponding environmental state information;
  according to the calculated action value with the certainty for each action, determining an action value considering an uncertainty based on a lower bound of a confidence interval according to a preset strategy; and
  determining an action with a largest action value with uncertainty as the action used for the vehicle control.

8. An apparatus for implementing autonomous driving decision-making, comprising a memory and a processor, wherein a computer program is stored in the memory;
  wherein the processor is configured to execute the computer program in the memory; and when the computer program is executed by the processor, the processor is caused to perform following steps:
  performing probabilistic object detection on image information collected by a camera deployed proximity to an unmanned vehicle to obtain a set of probabilistic object detection results;
  generating a piece of environmental state information according to perceptual information acquired by a radar and each probabilistic object detection result in the obtained set of the probabilistic object detection results respectively, and generated pieces of environmental state information are grouped into an environmental state information set;
  generating an optional action set of optional actions used for the vehicle control according to the generated environmental state information set; and
  determining an action used for vehicle control according to the generated optional action set and the environmental state information set;
  wherein the perceptual information and the image information are collected at a same time moment wherein; the processor is configured to:
  process the environmental state information set by a preset first decision-making method to generate a first action;
  process each piece of environmental state information in the set of environmental state information respectively by a preset second decision-making method to generate a second action corresponding to the environmental state information; and
  determine a set composed of the first action and the second action as an optional action set;
  wherein the preset first decision-making method comprises a decision-making method without considering object semantic information, and the preset second decision-making method comprises a decision-making method considering the object semantic information.

9. The apparatus according to claim 8, wherein the processor is configured to:
  for each action used for vehicle control in the optional action set, calculate an action value with certainty of each piece of corresponding environmental state information;
  according to the calculated action value with the certainty for each action, determine an action value considering an uncertainty based on a lower bound of a confidence interval according to a preset strategy; and
  determine an action with a largest action value with uncertainty as the action used for the vehicle control.

10. The apparatus according to claim 8, wherein the processor is configured to:
  for each action used for the vehicle control in the optional action set, calculate an action value with certainty of each piece of corresponding environmental state information;
  according to the calculated action value with the certainty for each action, determine an action value considering an uncertainty based on a lower bound of a confidence interval according to a preset strategy; and
  determine an action with the largest action value with uncertainty as the action used for the vehicle control.

* * * * *